United States Patent
Maria

(10) Patent No.: US 8,505,087 B2
(45) Date of Patent: *Aug. 6, 2013

(54) SIGNAL TRANSFER POINT FRONT END PROCESSOR

(71) Applicant: AT&T Mobility II LLC, Bedminister, NJ (US)

(72) Inventor: Arturo Maria, Bellevue, WA (US)

(73) Assignee: AT&T Mobility II LLC

( * ) Notice: Subject to any disclaimer, the term of this patent is extended or adjusted under 35 U.S.C. 154(b) by 0 days.

This patent is subject to a terminal disclaimer.

(21) Appl. No.: 13/766,002

(22) Filed: Feb. 13, 2013

(65) Prior Publication Data

US 2013/0160107 A1    Jun. 20, 2013

Related U.S. Application Data

(63) Continuation of application No. 13/530,694, filed on Jun. 22, 2012, now Pat. No. 8,413,228, which is a continuation of application No. 12/462,971, filed on Aug. 12, 2009, now Pat. No. 8,239,932.

(51) Int. Cl.
*G06F 21/00* (2006.01)

(52) U.S. Cl.
USPC ......... 726/13; 726/2; 370/351; 370/352; 370/467; 370/524; 379/229; 379/230

(58) Field of Classification Search
USPC ......... 726/1–3, 12–13, 25; 370/229–230, 370/351–352, 522–524; 379/229–230
See application file for complete search history.

(56) References Cited

U.S. PATENT DOCUMENTS

| | | | | |
|---|---|---|---|---|
| 6,996,225 | B1 * | 2/2006 | Bordonaro et al. | 379/229 |
| 7,263,111 | B1 * | 8/2007 | Davis et al. | 370/522 |
| 7,774,849 | B2 * | 8/2010 | Russell et al. | 726/25 |
| 2002/0064149 | A1 * | 5/2002 | Elliott et al. | 370/352 |
| 2002/0186723 | A1 * | 12/2002 | Sprague et al. | 370/524 |
| 2003/0231622 | A1 * | 12/2003 | Gilchrist et al. | 370/352 |
| 2005/0135340 | A1 * | 6/2005 | Lee et al. | 370/352 |
| 2006/0034329 | A1 * | 2/2006 | Miller et al. | 370/467 |

OTHER PUBLICATIONS

Sengar, H. • Wijesekera, D. • Jajodia, S.; MTPSec: customizable secure MTP3 tunnels in the SS7 network;Parallel and Distributed Processing Symposium, 2005. Proceedings. 19th IEEE International.*

* cited by examiner

*Primary Examiner* — Andrew L Nalven
*Assistant Examiner* — Amir Mehrmanesh
(74) *Attorney, Agent, or Firm* — Ronald D. Slusky

(57) ABSTRACT

In an SS7 network, each of a plurality of Signal Transfer Points is fronted by a front-end processor (STP-FEP) that has a network presence. The STP-FEP implements at least the MTP2 layer of the SS7 protocol stack and implements security rules at the MTP2 and MTP3 layers.

7 Claims, 7 Drawing Sheets

SIGNAL TRANSFER POINT FRONT END PROCESSOR

CROSS-REFERENCE TO RELATED APPLICATION

This is a continuation of patent application Ser. No. 13/530,694, filed Jun. 22, 2012, which was a continuation of patent application Ser. No. 12/462,971, filed Aug. 12, 2009, now U.S. Pat. No. 8,239,932 issued Aug. 7, 2012.

BACKGROUND

The present invention relates to packet transmission and, more particularly, to the filtering of packets transmitted over SS7 and other packet transmission networks.

At each signaling point of a Signaling System 7 (SS7) network is some type of computer element that has a network card connecting the point to the network. These network cards are designed to operate in accordance with the SS7 protocol, which defines standards for communication between signaling points. Among those signaling points are Signal Transfer Points (STPs). These are switching elements of SS7 networks that route SS7 packets between network endpoints. Signal Transfer Points perform signal routing, packet integrity controls and routing analysis of SS7 packets.

Signal Transfer Points are essentially network routers which do not have sophisticated packet-filtering processors and thus have limited inherent security capabilities. This makes Signal Transfer Points vulnerable to viruses and various network vulnerabilities. Packets known to be, or at least suspected of, carrying viruses or constituting other kinds of threats are referred to herein as "malicious" packets.

SUMMARY OF THE INVENTION

In order to deal with the problem of malicious packets, it is known to install SS7 firewalls at points within the SS7 network. Such firewalls implement security rules at the User Part of the SS7 protocol stack to identify and suppress (or "discard" or "deny") malicious packets.

I have recognized, however, that more sophisticated packet filtering functionality is possible.

An aspect of the invention is a front end processor for SS7 Signal Transfer Points. In accordance with the invention, this Signal Transfer Point Front-End Processor, or STP-FEP, implements at least a portion of Message Transfer Part Level 2 (MTP2) of the SS7 protocol stack and thus, when installed in an SS7 network, has a network presence. Indeed, the STP-FEP may advantageously be given the same point code (SS7 network address) of its associated Signal Transfer Point. The STP-FEP either forwards incoming SS7 packets to the associated Signal Transfer Point or denies them based on one or more "packet-denial" rules based at least in part on at least a portion of the MTP2 header.

In particular embodiments, the STP-FEP also implements at least a portion of Message Transfer Part Level 3 (MTP3) of the SS7 protocol stack and the one or more packet-denial rules may be further based at least in part on at least a portion of the MTP3 header, and/or based at least in part on SS7 parameters that are processed at MTP3, such as the point codes in the SS7's Routing Label.

defined in terms of at least one parameter that is processed at MTP3.

As described hereinbelow, the STP-FEP of the present invention provides advantages over the conventional SS7 firewall which operates at higher levels of the SS7 protocol stack.

DETAILED DESCRIPTION OF ILLUSTRATIVE EMBODIMENTS

Figure 1:
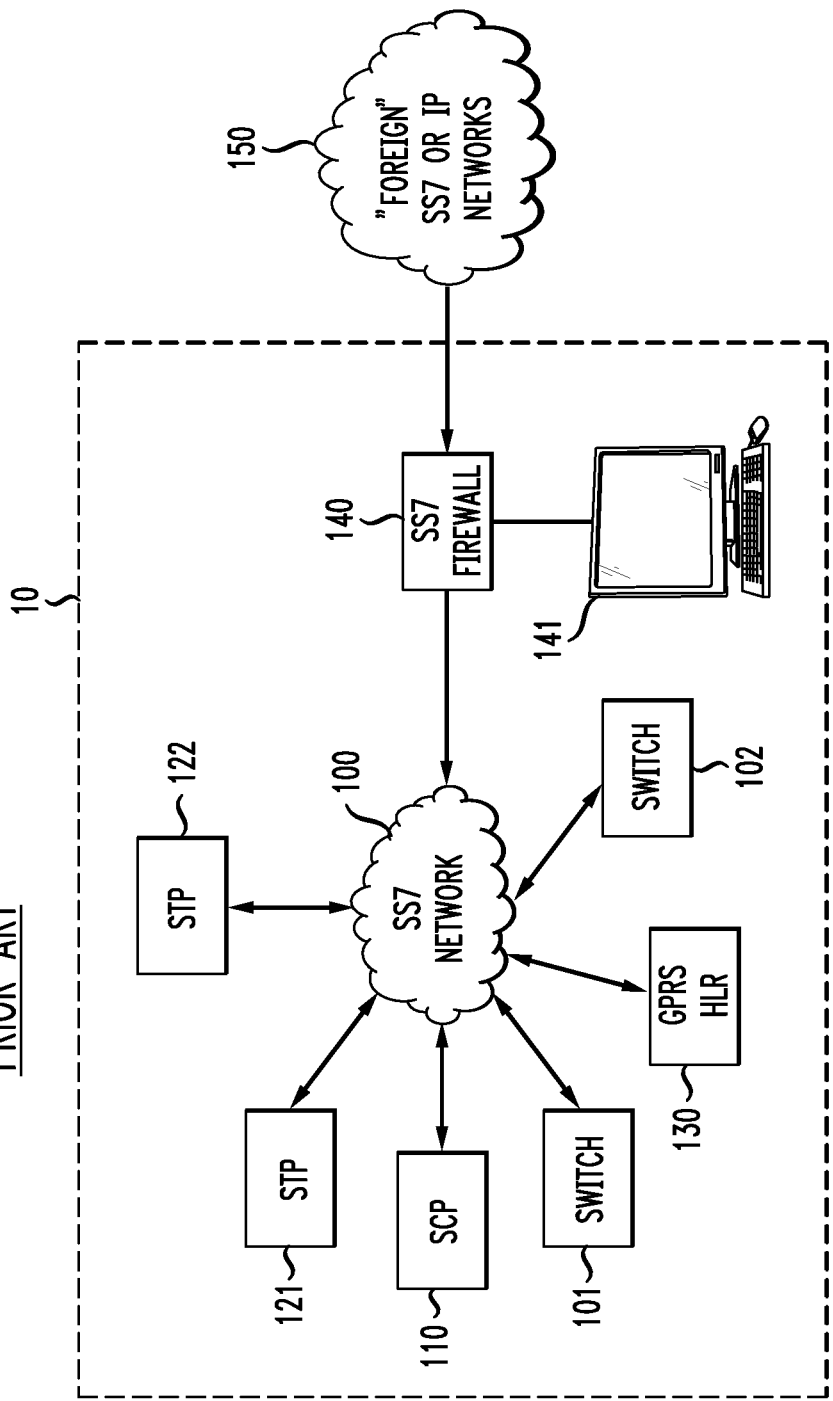
FIG. 1 shows a prior art SS7 network.

FIG. 1 shows elements of a telecommunications network 10—which is illustratively a wireless communication network—implementing the prior art approach of implementing SS7 security using a firewall.

Network 10 includes a plurality of switches, such as switches 101 and 102, which set up and support circuits between user terminals, such as cellular telephones communicating with the switches via cellular base stations, neither of which are shown. Also not shown is the network infrastructure of trunks and other links over which those circuits are established. What is shown, however, is SS7 network 100 over which switches such as switches 101 and 102 communicate between and among themselves and other network elements using the packet-based, SS7 protocol in order to set up and tear down calls and perform other internal network tasks. Entities that communicate across and within an SS7 network are referred to as "signaling points." Signaling points shown in FIG. 1 include Signal Control Point, or SCP, 110; General Packet Radio System/Home Location Register, or GPRS HLR, 130, and Signal Transfer Points, or STPs, 121 and 122. The Signal Transfer Points, in particular, are switches that route SS7 packets—also referred to herein as "messages,"—among the other SS7-communicating entities. It will be understood by those skilled in the art that an SS7 network may have any number of these and other elements, as may be appropriate for the network in question.

All of the elements of network 10, including SS7 network 100, may be under the aegis and control of a single entity, such as a particular telecommunications provider, such as AT&T. As such, there is little concern about malicious SS7 packets being generated by any of network elements thus described. However, SS7 network 100 may interface with other SS7 or Internet Protocol (IP) networks 150 over which the company that is operating network 10 may have no control including roaming partners. Indeed, any one of "foreign" networks 150 may be a source of malicious packets that could plant viruses within the network elements in or associated with network 10, or cause other kinds of network disruptions, such as flooding the network with packets as a way of disrupting its operation.

In order to protect SS7 network 100 from malicious packets, it is known in the prior art for network 10 to include an SS7 firewall 140 which inspects all SS7 packets received from foreign network 150. A typical such firewall is disclosed in U.S. Pat. No. 6,308,276, which is hereby incorporated by reference as though fully set forth herein.

Firewall 140 is provisioned by firewall security administration 141 with security rules that define characteristics, content or other aspects of packets that are likely to be malicious and that should be "denied," or discarded, rather than being allowed to pass into SS7 network 100. Firewall 140 is representative of any one or more of such firewalls that may be deployed at the edge of network 100 at each point of connection between SS7 network 100 and other SS7 networks. Such firewalls may also be deployed within the SS7 network itself.

Firewall 140 applies its security rules at the SS7 Message Transfer Part Level 3 and above. To understand this more clearly, reference may be made to FIG. 2 which shows the SS7 protocol stack, which is modeled after the seven-layer Open Systems Interconnection (OSI) model.

The SS7 protocol stack is a four-level protocol stack divided into two main "parts"—a Message Transfer Part encompassing Levels 1, 2 and 3 (MTP1, MTP2 and MTP3), and a User Protocol part encompassing SCCP, ISUP and TCAP applications messages at Level 4.

The Message Transfer Part is sub-divided into three sub-parts MTP1, MTP2 and MTP3, corresponding to Levels 1, 2 and 3 of the protocol stack.

MTP1 is the so-called physical layer responsible for the physical, electrical, and functional characteristics of the digital signaling links in the network. It is equivalent to the OSI physical layer. Physical interfaces defined include E-1, DS-1, V.35, DS-0 and DS0A.

MTP2 is equivalent to the OSI data link layer. It ensures accurate transmission across an individual signaling link by inspecting a packet for message integrity and proper format. Implemented at this level are flow control, message sequence validation and error checking. When an error occurs on a signaling link, the message in error (or set of messages) is retransmitted. MTP2 ensures integrity of message delivery.

MTP3 is loosely equivalent to the OSI network layer. It provides message routing between signaling points in the SS7 network, including re-routing traffic away from failed links This layer also controls traffic when congestion occurs or a signaling point fails. MTP3 is also responsible for identifying a signaling message's type, and then distributing it up the stack to the correct user part. MTP3 is also the network manager. It performs functions that provide rules and procedures for opening and maintaining links, and also for placing them back into service after a link or point failure.

Figure 2:
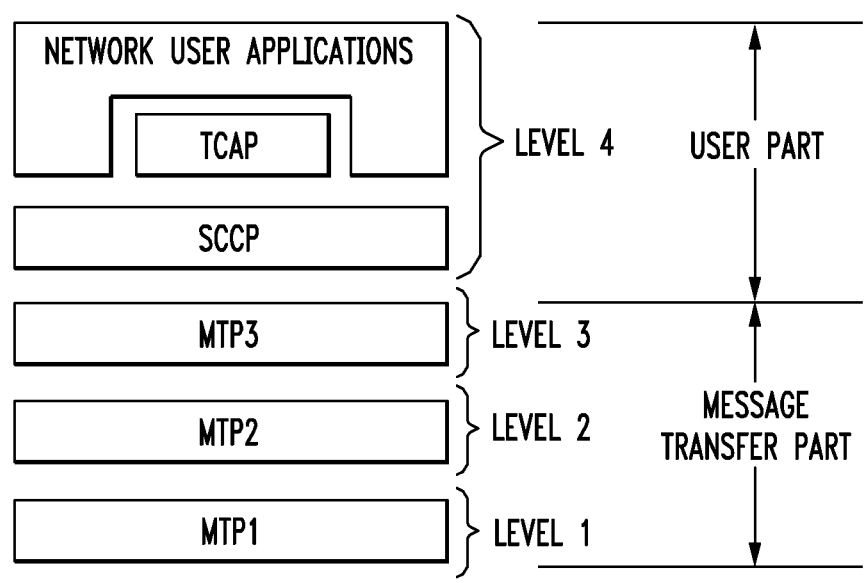
FIG. 2 depicts the SS7 protocol stack.

The User Part includes protocols and applications entities at Level 4 of the protocol stack. Several of these are shown in FIG. 2. Specifically:

SCCP (Signaling Connection Control Part) is a higher level protocol than MTP that provides end-to-end routing.

TCAP (Transactional Capabilities Application Part) facilitates connection to an external database. Information/data received is sent back in the form of a TCAP message. TCAP also supports remote control—the ability to invoke features in another remote network switch. TCAP messages are routed to their proper database by SCCP.

NETWORK USER APPLICATIONS are applications used, in large part, to set up telephone calls and to carry out network management functions. These applications may or may not use TCAP services, and include a) ISUP (ISDN User Part), which supports basic telephone call connect/disconnect between end offices, supports ISDN and intelligent networking functions, and links cellular and PCS networks to the Public Switched Telephone Network, or PSTN; b) BISUP (Broadband ISDN User Part), which is an ATM protocol intended to support services such as high-definition television (HDTV), multilingual TV, voice and image storage and retrieval, video conferencing, high-speed LANs and multimedia; c) MAP (Mobile Application Part), which is used to share cellular subscriber information among different networks, and includes information such as the mobile identification number (MIN), and the serial number of the cellular handset; and d) OMAP (Operations, Maintenance and Administrative Part), which is an applications entity that uses TCAP services for communications and control functions through the network via a remote terminal.

Figure 3:
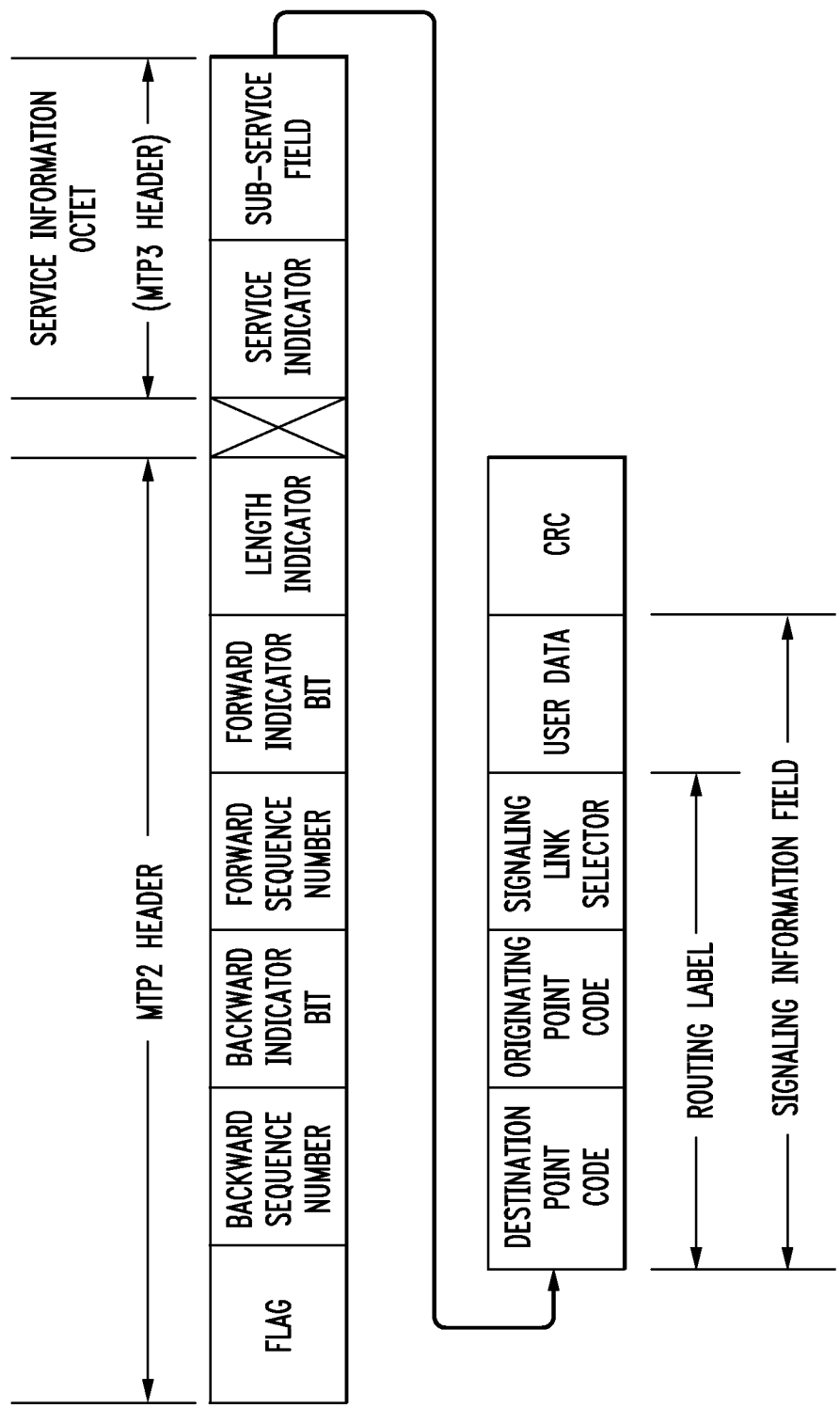
FIG. 3 shows the format of an SS7 signaling message.

FIG. 3 depicts the basic format of an SS7 packet, or "Message Signaling Unit." A Message Signaling Unit comprises an MTP2 header; an MTP3 header, formally referred to as the Service Information Octet; a Signaling Information Field; and a CRC checksum.

Specifically, the MTP2 header is comprised of fields whose contents are used at Level 2 of the SS7 protocol stack to provide for the reliable transmission of the Message Signaling Unit over an individual signaling link.

The specific fields of the MTP2 header include a Flag that demarcates the start of the packet; a Backward Sequence Number used to acknowledge message signal units which have been received from the remote end of the signaling link; a Backward Indicator Bit, which together with the Forward Indicator Bit and the Forward Sequence Number and Backward Sequence Number is used in the basic error control method to perform signal unit sequence control and acknowledgment functions; the Forward Sequence Number; the Forward Indicator Bit; and a Length Indicator indicating the number of octets following the length indicator itself. The MTP2 header is followed by two unused bits. The CRC field is used at the MTP2 level for error correction and control.

Once the processing at MTP2 has been accomplished, the remainder of the Message Signaling Unit (Message Signaling Unit without the MTP2 header) is handed up to the MTP3 layer to establish an end-to-end route for the Message Signaling Unit through the SS7 network based on a destination point code contained within the Message Signaling Unit's Routing Label (described below). Specifically, the MTP3 layer searches routing tables to identify a route through the SS7 network to the destination identified by the destination point code.

The MTP3 header is formally referred to as the Service Information Octet. The Service Information Octet contains general message characteristics for identifying the network type, prioritizing messages (ANSI only), and delivering them to the appropriate MTP3 user. The Service Information Octet comprises a Service Indicator and a Sub-Service Field. Service Indicator codes are used to perform message distribution and in some cases to perform message routing and are used in international signaling networks for a number of purposes, including signaling network management messages; signaling network testing and maintenance messages; SCCP; and in various user parts.

When an SS7 node receives messages, the Service Information Octet and a portion of the Signaling Information Field (described below) are used to perform discrimination, routing, and distribution. The service indicator specifies which MTP3 user (ISUP, OMAP, etc.) has placed a message in the Signaling Information Field and thus designates the type of information contained within the Signaling Information Field user data field (described below). For example, a Service Indicator value of 0 indicates that the Signaling Information Field contains Signaling Network Maintenance data. A Service Indicator value of 5 indicates that the Signaling Information Field contains ISUP information, and so forth. The Sub-Service Field contains a network indicator and two spare bits to discriminate between national and international messages.

The remainder of the Message Signaling Unit is the Signaling Information Field, which contains routing information and the actual payload data being transported by the MTP3 service to the higher levels of the protocol stack. Data in the Signaling Information Field is also used in connection with call control, network management, and database query/response.

The Signaling Information Field contains a Routing Label that is used for routing the message within the network. Its fields are: Destination Point Code, which is the point code of the destination node; an Originating Point Code, which is the point code of the node originating the message; and a Signaling Link Selector, which is an identifier used for load sharing across link sets and links the actual user data being transported by the Message Transfer Part, such as telephone numbers, control signals and maintenance messages. Finally, the Signaling Information Field contains signaling information comprising information elements, user data and component/transaction information appropriate to a particular protocol being used at the network endpoints.

The packet stripped of both the MTP2 and MTP3 headers is called a Protocol Data Unit (PDU) and comprises both the routing label and the aforementioned signaling information. The Routing Label is not only used by the Message Transfer Part to route the message towards its destination point, as noted above, but is also used by the relevant User Part to identify the particular task to which the message refers (e.g., a telephone circuit).

As previously mentioned, firewall 140 enforces security rules at the higher layers, which are associated with Level 4 of the SS7 protocol stack. Specifically, firewall 140 processes received message signaling units up through the MTP portion of the SS7 protocol stack, as described above. Firewall 140 does not actually carry out MTP functions, such as communicating with various signal points at the MTP2 layer to, for example, obtain retransmission of errored packets. Rather, the processing performed by firewall 140 vis-à-vis the Message Transfer Part is simply that required to extract the Protocol Data Unit so that the Protocol Data Unit can be inspected and security rules applied based on the Protocol Data Unit's content.

Figure 4:
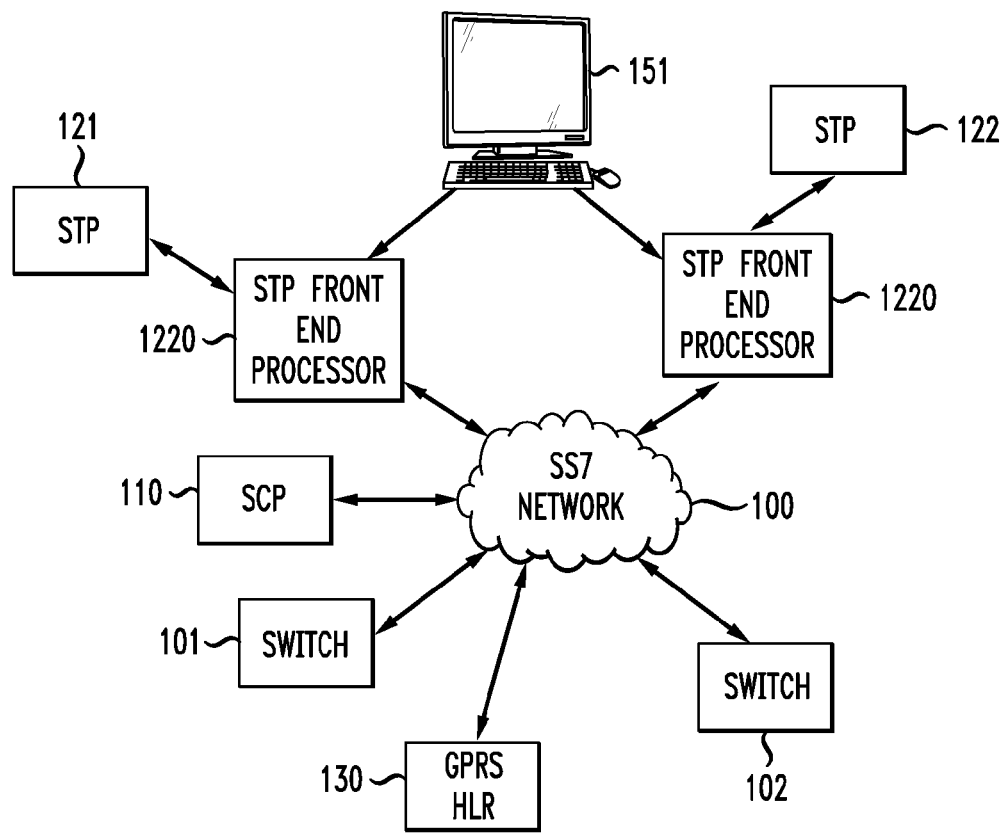
FIG. 4 shows the network of FIG. 1 modified to incorporate, for each of a plurality of SS7 Signal Transfer Points, a front end processor (STP-FEP) embodying the principles of the present invention.

Based on the aforementioned identification of the associated higher-level protocol, a determination is also made as to which, if any, security rules are relevant to the Protocol Data Unit in question. If at least one security rule is, in fact, relevant, the operation of an appropriate protocol firewall engine is invoked. The protocol firewall engine applies the rule and makes a determination as to what action is to be taken—for example, most typically, whether the packet should be denied or passed. through the firewall to its addressed destination FIG. 4 shows telecommunications network 10 but now including Signal Transfer Point Front End Processor, or STP-FEP, 1210 and STP-FEP 1220 embodying the principles of the present invention. Although network 10 might continue to include firewall 140 and its associated security administration 141, it need not do so and, indeed, the embodiment of FIG. 4 does not include those components.

STP-FEPs 1210 and 1220 enforce security rules associated with at least the MTP2 layer of the SS7 protocol stack and, in the illustrative embodiment, associated with, both the MTP2 and MTP3 layers. To this end, security rules, or "heuristics," are downloaded into STP-FEPs 1210 and 1220 from security provisioning server 151 via, for example, an IP connection. The protocol firewall engines of firewall 140, S7P-FEPs, 1210 and 1220 apply the rules downloaded into them and make a determination as to what action is to be taken—for example, most typically, whether a packet should be passed or denied.

Unlike prior art firewall 140, however, each of the present STP-FEPs is associated with, and serves as a front end for, an individual Signal Transfer Point. In this example, STP-FEP 1210 is associated with, and serves as a front end for, Signal Transfer Point 121, and STP-FEP 1220 is associated with, and serves as a front end for, Signal Transfer Point 122. Each STP-FEP has a "network presence" Indeed, the point code (network address) of each STP-FEP is the address on the SS7 network of its associated Signal Transfer Point. Thus, each STP-FEP appears to the rest of the SS7 network to actually BE the associated Signal Transfer Point. Indeed, because the STP-FEP is intended to appear to be a Signal Transfer Point, preferred embodiments implement no portion of the SS7 protocol stack higher than the Signaling Connection Control Part, which is the highest portion of the SS7 protocol stack implemented by a Signal Transfer Point.

And because the STP-FEP is a separate network element, access to the STP-FEP can be provided to certain network administrators for purposes of administering the security rules while, desirably, not necessarily allowing particular administrators to have access to the associated Signal Transfer Point.

As a provisioning matter, the point code could be assigned by the SS7 network administrator or could be assigned by an SS7 provisioning gateway which stores and keeps tracks of point codes in the SS7 network. The point code would be stored in a configuration table within the STP-FEP operating system executing on the hardware platform on which the various components of the STP-FEP are implemented (discussed hereinbelow). The operating system would refer to the point code when performing its network screening functions. It interfaces with the provisioning server 151, which can configure the operating system remotely.

Figure 5:
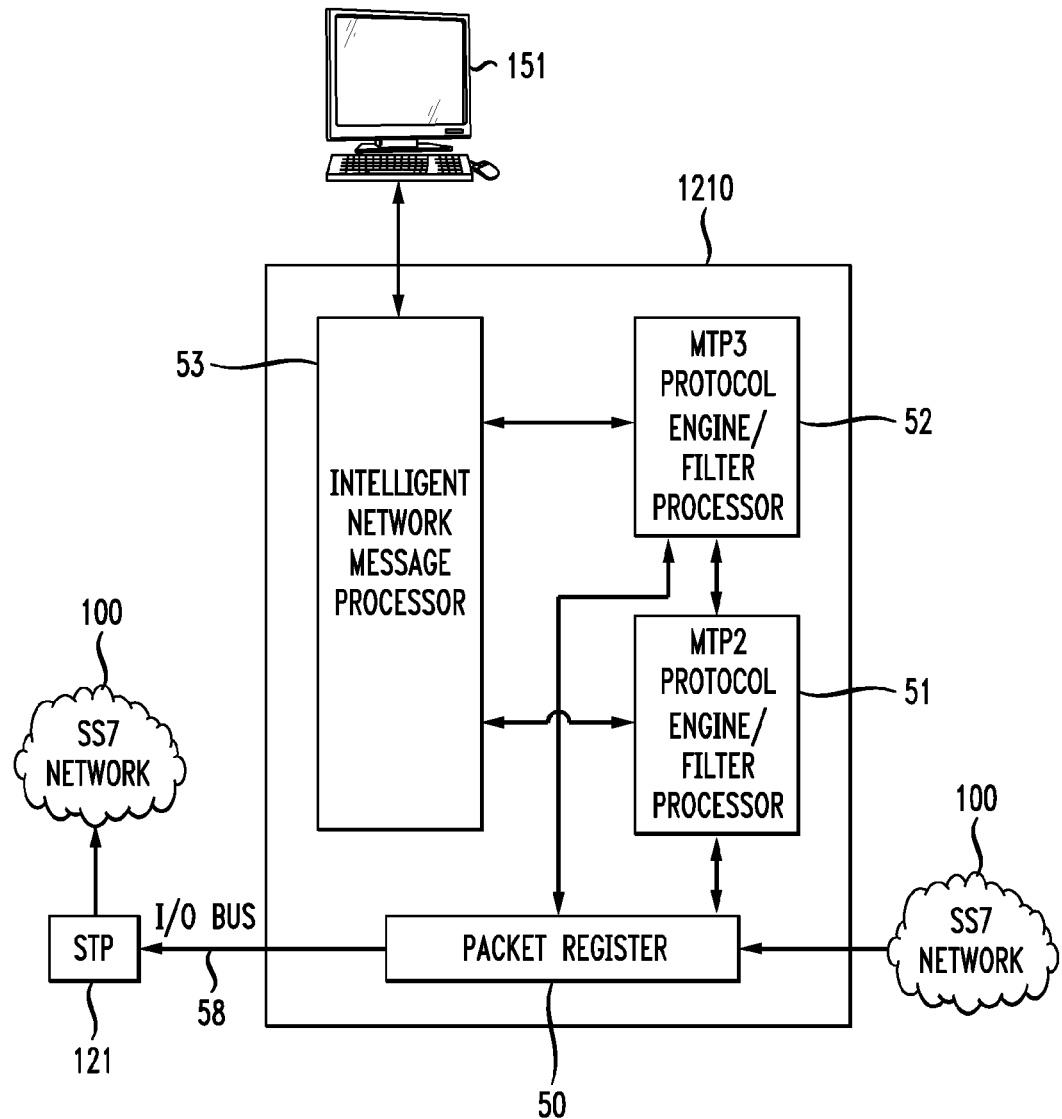
FIG. 5 is a block diagram of an illustrative implementation of an STP-FEP.

FIG. 5 is a conceptual block diagram of STP-FEP 1210. STP-FEP 1220 is substantially similar.

STP-FEP 1210 includes packet register 50; MTP2 protocol engine/filter processor 51; MTP3 protocol engine/filter processor 52; and intelligent network message processor 53.

STP-FEP 1210 is installed and provisioned in network 10 to have the point code that would otherwise be assigned to its associated Signal Transfer Point 121.

Thus an SS7 packet addressed to that point code through SS7 network 100 arrives at STP-FEP 1210, where it is stored in packet register 50. A copy of the packet is thereupon first processed by MTP2 protocol engine/filter processor 51. The latter implements at least a portion, and illustratively implements all, of MTP2 and, as, such, has the MTP2 functionality of an STP. Thus protocol engine/filter processor 51 inspects each received packet for message integrity and proper format, as well as carrying out the MTP2 functions of flow control, message sequence validation and error checking. Upon detecting a signaling link error, protocol engine/filter processor 51 obtains retransmission of the errored packets addressed to the associated Signal Transfer Point 121.

Protocol engine/filter processor 51 thereupon examines the packet based on MTP2 message heuristic and filtering rules that identify packets that are to be regarded as malicious, as described hereinbelow. Packets that are deemed malicious are discarded, or "denied." Packets not deemed malicious are passed to MTP3 protocol engine/filter processor 52.

Pursuant to standard nomenclature applied in the art to firewalls, security-, or packet-denial-, rules are fixed sets of commands that instruct the firewall to deny packets based, for example, on point codes or services requested. Heuristics, by contrast, apply knowledge that is dynamically acquired by keeping track of SS7 message patterns to identify malicious packets. From this perspective, firewall rules are fixed determinants while heuristics comprise dynamically acquired information. For purposes of this disclosure, information used by an FEP-STP to determine that a packet should be denied, whether a fixed rule as just explained, or whether heuristically-developed information used to determine whether to deny a packet, is referred to herein as a packet-denial rule.

MTP3 protocol engine/filter processor 52 has at least enough MTP3 functionality as to be able to examine a packet's Routing Label and to identify one or more of its three fields. Similar to what was done at the MTP2 layer, the packet is examined based on MTP2 message heuristic and filtering rules that identify packets that are to be regarded as malicious, as described hereinbelow. Packets that are deemed malicious are discarded, or "denied." If a packet is not deemed malicious, MTP3 engine/filter processor 52 enables packet register 50 to pass the packet on to Signal Transfer Point 121 over Input/Output (I/O) bus 58. I/O bus 58 provides a tightly coupled interface between STP-FEP 1210 and Signal Transfer Point 121. This allows the STP-FEP to act as part of the Signal Transfer Point and not be susceptible to network issues. "Tightly coupled," specifically, means that the STP-FEP and its associated Signal Transfer Point appear to be a single signaling node, even though they are two separate hardware entities. This is accomplished by connecting the STP-FEP to the STP using an I/O bus that bypasses any network connection. The I/O bus is a electrical and electronic subsystem that transfers data between the STP-FEP and the STP. The I/O bus uses multiple parallel and bit-serial connections and provides logical functionality between the STP and STP-FEP operating systems.

Figure 6:
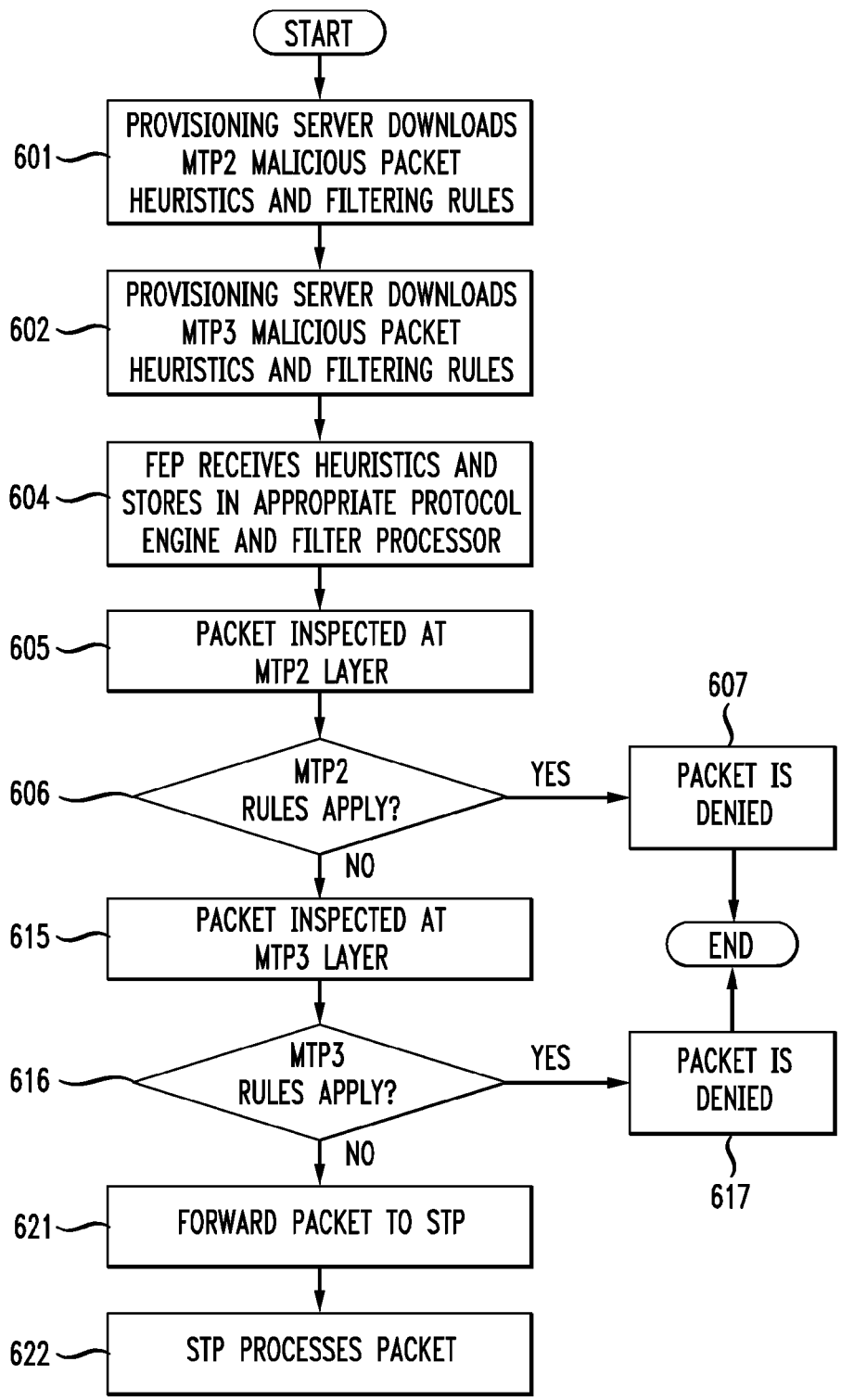
FIG. 6 is a flow chart depicting aspects of the operation of the STP-FEP.

FIG. 6 shows illustrative processing carried out within network 10 and, more particularly, by STP-FEP 1210.

Provisioning server 151 downloads MTP2 and MTP3 malicious packet heuristics and filtering rules to STP-FEP 1210, as indicated at 601 and 602. Examples are these are given below. Within STP-FEP 1210, the heuristics and filtering rules are received by intelligent network message processor 53, which supplies them to MTP2 and MTP3 protocol engine/filter processors 51 and 52, respectively, as indicated at 604.

When a packet arrives, MTP2 engine/filter processor 51 inspects the packet at 605 to see if any MTP2 rules or heuristics apply that is, whether the packet meets any rules applicable at layer 2 of the SS7 protocol for malicious packets, as indicated at 606. If yes, the packet is "denied" and not forwarded to MTP3 protocol engine/filter processor 52, as indicated at 607. Signal Transfer Point 121 is unaware of the packet denial.

If the packet is not deemed malicious based on any MTP2 rules, the packet is inspected at the MTP3 layer by MTP3 protocol engine/filter processor 52, as indicated at 615, to see if any MTP3 rules or heuristics apply that is, whether the packet meets any rules applicable at layer 3 of the SS7 protocol for malicious packets, as indicated at 616. If yes, the packet is "denied" and not forwarded to Signal Transfer Point 121, as indicated at 617. Again Signal Transfer Point 121 is unaware of the packet denial.

If the packet is not deemed malicious based on any MTP3 rules or heuristics, the packet is forwarded to Signal Transfer Point 121 for normal processing, as indicated at 621 and 622.

Overall, then, it can be seen that the various components of STP-FEP 1210 comprise a processing entity that a) makes a determination, for each non-errored received SS7 packet and for each of one or more packet-denial rules, whether the packet meets any one or more of the rules and b) passes the packet to Signal Transfer Point 1210 only if none of the rules are met. At least one of the packet-denial rules is based, at least in part, on at least one portion of the SS7 Message Transfer Part Level 2 header. That portion of MTP2 that determines that a packet is in error and a transmitted packet needs to be obtained before the packet is passed to MTP3 might, as a matter of linguistics, be thought of as a "packet-denial" rule. However, the packet-denial rules referred to herein do not encompass any rule defined in any International Telecommunications Union SS7 Recommendation.

An example of a scenario involving an MTP2 packet-denial rule is a Denial-of-Service (DOS) scenario. As noted above, each SS7 message has a Sequence Number Unit (SU) which carries two numbers—a Forward Sequence Number and a Backward Sequence Number. These are used for SU acknowledgment and sequence control. In particular, the backward sequence numbers in successively received messages may have gaps because of network congestion or link failure conditions. When this occurs, it is necessary to scan through these gaps and find the sequence number before the first gap so the message can be requested to be retransmitted. As an example, assume that the following messages with their associated backward sequence numbers have been received: 1, 2, 3, 4, 5, 6, 7, 8, 9, 10, 13, 14. In a normal environment, the MTP2 processor of a Signal Transfer Point would communicate with the MTP3 layer that the last message it received was 10. Messages with sequence numbers 13, 14 would not be delivered to the MTP3 layer because to do so would violate ordered delivery of the messages within the stream (i.e. messages with backward sequence numbers 11 and 12 are missing). The MTP3 processor of the Signal Transfer Point would then request via the MTP2 layer for the signaling node to retransmit messages with sequence numbers 11-12 potentially on an alternate link.

In view of the foregoing, a denial-of-service attack could be mounted in which the sending node would continuously send SS7 messages with missing sequence numbers, in an attempt to overwhelm the Signal Transfer Point and not allowing it do much of anything except attempting to obtain missing messages.

The STP-FEP can thwart such an attack, however. Intelligent Network Message Processor 53, could "observe" the denial-of-service attack taking place by noticing that a large number of packet streams were being received from, or directed to, one or more particular point codes with missing sequence numbers, leading to a packet-denial rule saying that such packets should be discarded rather than being passed to the Signal Transfer Point. That rule would be uploaded to provisioning server 151 which could, then, in turn, download the rule to other STP-FEPs. Thus such messages would not be forwarded to the STP-FEP MTP3 processor and thus would not be forwarded to the Signal Transfer Point itself. This would enable the Signal Transfer Point to continue operations sending and receiving messages on other unaffected SS7 links without being overwhelmed.

An example of a scenario involving a combined MTP2/MTP3 packet-denial rule is one in which malicious actors are attempting to download program code to mobile phones (such as injectors) that rely on a series of long SMS (short-message-service) messages which are concatenated. Upon learning of this network threat, the message provisioning server 151 could download a rule to the STP-FEP indicating that a) if the user data is of at least a certain length and b) originated from a signaling point with a particular point code, then the packet should be denied. The length of the user data is determined at MTP2 by way of the Length Indicator field. The Originating Point Code is examined at MTP3. Being able to implement rules involving both MTP2 and MTP3 fields would require minor modification to the flowchart of FIG. 6, such as by invoking the operation of an intelligent network inspection engine after step 616 which would combine message heuristics for MTP2 and MTP3 header formats and would determine and execute actions in accordance with engine operating system logic.

Examples of scenarios involving an MTP3 rule or heuristic are the following:

Denial-of-Service Attacks to a Particular STP:

In this scenario, a rogue or malicious node might attempt to overwhelm a particular Signal Transfer Point with numerous messages. Upon the provisioning server becoming aware of this situation, it could download the source point code of the source of these messages with a rule specifying that messages from this source to this particular Signal Transfer Point are to be denied.

Distributed Denial-of-Service Attacks:

In this scenario, the provisioning server would download a series of source point codes and destination point codes with a rule specifying that messages from any of those source to any of those destinations are to be denied by a particular STP-FEP or a series of STP-FEPs. This would prevent malicious nodes from overwhelming an Signal Transfer Point or a series of Signal Transfer Points in order to shut down portions of the network.

In any of these scenarios, data in the MTP3 header might also be used. For example, the MTP3 header's Service Indicator identifies the user part application (ISUP, OAMP, TCAP, etc) for the message in question. So suppose it has been determined that a current spate of malicious packets involving particular originating and/or destination point codes are always messages involving a particular user part application, such as ISUP. In that case, a security rule can be specifically tailored to such packets, allowing other, non-malicious packets involving those point codes to pass to the Signal Transfer Point.

The STP-FEPs can also screen the SS7 messages for malformation, such as an incorrect value of the MTP2 header's Length Indicator. Such a packet, if allowed to proceed, might be able to plant program code or otherwise exploit deficiencies or bugs in the Signal Transfer Point. Message malformation could be checked at the MTP2 and MTP3 header levels. If a significantly large number of malformed packets originate from one or more particular sources or are directed to one or more particular destinations, it could be surmised that such an attack is underway, leading to a rule to deny packets having such origination or destination point codes.

Another possibility might be to actually correct the malformed message header(s) to reflect proper content such as proper value of the Length Indicator. Non-malicious packets from/to such signal points that just happen to be malformed through network error could then be allowed to pass to the Signal Transfer Point and, from there, to its ultimate destination. In the event that message headers are to be corrected, as just suggested, the STP-FEP would not carry out a simple gating function using register 50 but, rather, would have MTP3 and MTP2 engines that would extract the packet's PDU and then reconstruct the MTP3 and MTP2 headers to reformulate the packet before passing it to the Signal Transfer Point.

A further possibility is that the STP-FEP could be programmed to mimic acknowledgment messages that certain SS7 users, such as are expected by sources of Short-Message-Service-related messages. Such acknowledgement messages could be transmitted by the STP-FEP upon discarding a malicious packet, making the sender believe that the malicious packet had, in fact, been delivered and thus, possibility, causing the attack to be stopped or diminished.

There are different ways in which the security rules or heuristics might be developed. In the simplest case, human operators monitoring overall network performance might carry out diagnostic tests that could identify the characteristics of malicious packets. Alternatively, malicious packet patterns could be detected by the Intelligent Network Message Processor 53 in each STP-FEP by, keeping so-called "stateful" information. This would allow Message Processor 53 to identify such events as an abnormally large number of messages arriving from a particular source, which could be taken a denial-of-service attack. Information as to that event could be forwarded to provisioning server 151 which, in turn, could develop an appropriate rule for distribution to STP-FEPs throughout the network.

Figure 7:
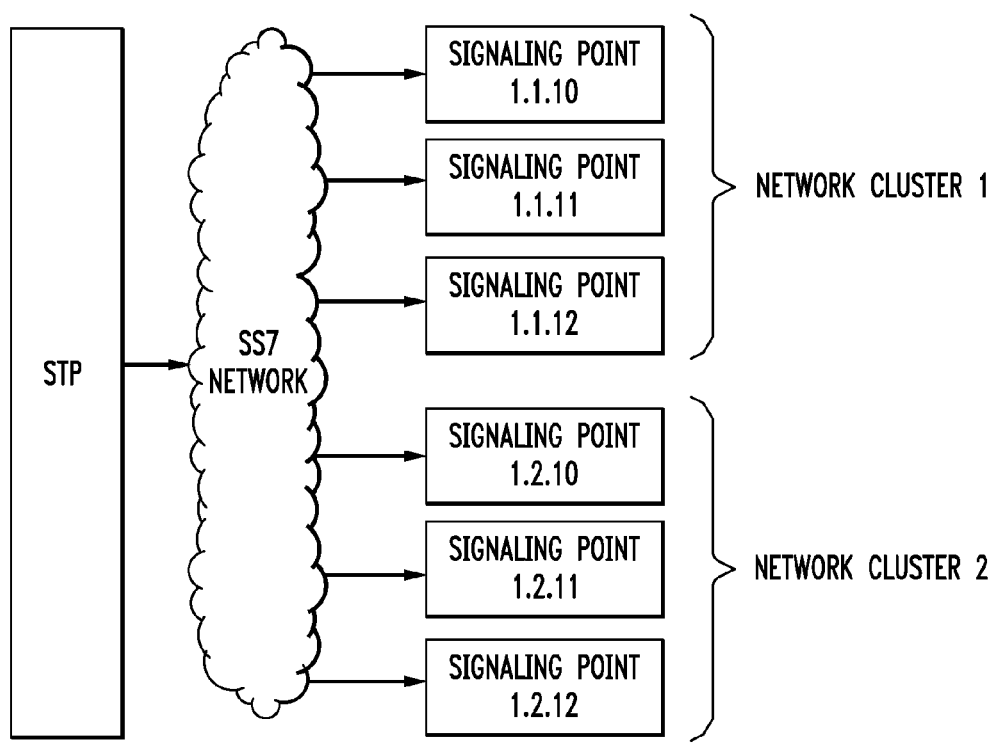
FIG. 7 illustrates the notion of network clusters in an SS7 network.

FIG. 7 illustrates the notion of network clusters in an SS7 network. As noted earlier, each signaling point (STP, SCP or switch) connected to an SS7 network has a network address referred to as a "point code." Point codes consist of three numerical parts, respectively representing the signaling point's network, its so-called cluster, and signaling point itself. By downloading an appropriate rule, provisioning server 151 can effectively shut down a particular Signal Transfer Point or a cluster of Signal Transfer Points by way of a rule that causes all packets destined for a particular Signal Transfer Point or a particular Signal Transfer Point cluster to be denied. Indeed, an entire SS7 network could be effectively shut down in this way. It will be appreciated from this example that the packet-denial rules are not necessarily security-related; it might be desired to shut down one or more Signal Transfer Points for, for example, maintenance or other network management reasons.

Standard components disclosed herein, including switches, Signal Transfer Points, and signal control points are available from such telecommunications infrastructure manufacturers as Alcatel-Lucent, Siemens, Northern Telecom, Ericsson, etc. Further details as to the SS7 protocol and its implementation are available in the Q.7xx-Series Recommendations of the International Telecommunications Union, including the following recommendations that are specific to the Message Transfer Part: ITU-T Recommendations Q.701-Q.704, Q.706 and Q.707.

Various functional elements shown in the drawings, such as the elements of STP-FEP 1210, are shown in FIG. 5 is being individual stand-alone elements. Indeed, they could be just that. However, any two or more of the components of the STP-FEP could be implemented on a common hardware platform, with the various STP-FEP functionalities shown and described herein being implemented by respective software components.

With the above in mind, it is noted that the MTP2 and MTP3 protocol engine/filter processors of the illustrative embodiment may be embodied as any desired type of processor-based hardware having associated program code implementing the SS7 MTP2 and MTP3 functionalities as defined in the above-cited Recommendations, augmented with filter processing as shown in the flowchart of FIG. 6 and also possibly augmented with appropriate teachings from the above-noted U.S. Pat. No. 6,308,276. As but one example, program code implementing the MTP2 and MTP3 protocols could be SS7 software available as part of the SS7 OEM developer's kit offered by NMS Communications Platforms Business, which is a part of Dialogic Corporation. The hardware to execute the software could be, for example, a TX board available from that vendor.

Message processor 53 can likewise be implemented as any desired type of processor-based hardware having associated program code implementing the functions described herein for that particular component and, again, could implement appropriate teachings from the above-noted patent as regards the downloading and distribution of rules and heuristics. One possibility would be for this processor to be implemented as software executing on the same hardware platform as the protocol engine/filter processors. Alternatively, message processor 53 could be a separate component or implemented on a high-performance blade system, such as the Hewlett-Packard Proliant G6 server, with software developed using the OEM kit noted above.

Provisioning server 151 may be implemented using any desired server hardware and software that implements the functions described herein for that particular component.

In the claims hereof, certain recited claim elements are expressed in terms of a means for carrying out one or more specified functions. The invention as defined by such claims resides in the combining of elements which carry out those functions in the way called for in the claims. I thus regard any means which carry out the specified functions as being equivalent to those shown and described herein.

The foregoing Detailed Description only illustrates the invention. Those skilled in the art will be able to devise numerous alternatives that, while not explicitly shown or described herein, implement the principles of the invention and thus are within its spirit and scope.

The invention claimed is:

1. A method for use in a system that includes a Signaling System 7 (SS7) network; a plurality of SS7 Signal Transfer Points connected to the SS7 network and each having an assigned SS7 point code; and a plurality of Signal Transfer Point Front End Processors (STP-FEPs) each connected to the SS7 network and each also connected to a respective associated one of the Signal Transfer Points via a connection that is not part of the SS7 network; each STP-FEP having an assigned SS7 point code that is the same as the SS7 point code assigned to its associated Signal Transfer Point so that packets addressed to an individual one of the Signal Transfer Points are received by its associated STP-FEP; and each STP-FEP being arranged to forward received packets to the associated Signal Transfer Point except for ones of the received packets that meet at least one packet-denial rule which is not defined in any International Telecommunications Union SS7 Recommendation, the method being performed by said at least one of said STP-FEPs and the method comprising receiving, from SS7 signaling points of the SS7 network, SS7 packets addressed to the Signal Transfer Point, each of said SS7 packets including an SS7 Message Transfer Part Level 2 header, obtaining, from the SS7 signaling points, retransmission of errored ones of said SS7 packets addressed to the SS7 Signal Transfer Point in accordance with at least a portion of SS7 Message Transfer Part Level 2, making a determination, for each non-errored received SS7 packet and for each of one or more packet-denial rules, whether said non-errored received SS7 packet meets any one or more of said rules and providing said non-errored received SS7 packet to the Signal Transfer Point only if none of said rules are met, wherein said determination is made when at least one of the packet-denial rules is based, at least in part, on at least one portion of the SS7 Message Transfer Part Level 2 header of said non-errored received SS7 packet.

2. The method of claim 1 wherein said one or more packet-denial rules are respective rules downloaded to said front-end processor from a provisioning server.

3. The method of claim 1 wherein said at least one portion of the SS7 Message Transfer Part Level 2 header is its Length Indicator.

4. The method of claim 1 wherein at least one of the packet-denial rules is further based, at least in part, on at least one portion of the SS7 Message Transfer Part Level 3 header.

5. The method of claim 1 wherein each of said SS7 packets further includes a Routing Label containing one or more point codes and wherein said determination is made further based on at least one of said point codes contained in said Routing Label.

6. The method of claim 1 wherein said portion of the SS7 protocol stack includes no portion of the SS7 protocol stack higher than the Signaling Connection Control Part.

7. The method of claim 1 wherein said non-errored received SS7 packet is provided to the Signal Transfer Point via a tightly coupled interface that is not within said SS7 network.

* * * * *